US010067290B2

United States Patent
Wu et al.

(10) Patent No.: US 10,067,290 B2
(45) Date of Patent: Sep. 4, 2018

(54) POLARIZATION SCRAMBLER BASED ON FARADAY MAGNETO-OPTIC EFFECT

(71) Applicants: Beijing Qi-Red PhotoElectric Technology Co., Ltd., Beijing (CN); Zibo Qi-Red PhotoElectric Technology Co.,Ltd., Beijing (CN)

(72) Inventors: Shudong Wu, Beijing (CN); Wenbo Wang, Beijing (CN)

(73) Assignees: Beijing Qi-Red PhotoElectric Technology Co., Ltd., Beijing (CN); Zibo Qi-Red PhotoElectric Technology Co.,Ltd., Beijing (CN)

( * ) Notice: Subject to any disclaimer, the term of this patent is extended or adjusted under 35 U.S.C. 154(b) by 0 days.

(21) Appl. No.: 15/605,560

(22) Filed: May 25, 2017

(65) Prior Publication Data

US 2017/0261773 A1 Sep. 14, 2017

(30) Foreign Application Priority Data

Feb. 10, 2017 (CN) .......................... 2017 1 0072555

(51) Int. Cl.
*G02B 6/27* (2006.01)
*G02F 1/01* (2006.01)
*G02F 1/095* (2006.01)

(52) U.S. Cl.
CPC ......... *G02B 6/2786* (2013.01); *G02B 6/2766* (2013.01); *G02F 1/0136* (2013.01); *G02F 1/095* (2013.01)

(58) Field of Classification Search
None
See application file for complete search history.

(56) References Cited

U.S. PATENT DOCUMENTS 3,756,690 A * 9/1973 Borrelli .................. G02F 1/095
  385/1
4,615,582 A * 10/1986 Lefevre .............. G01R 33/0322
  324/244

(Continued)

FOREIGN PATENT DOCUMENTS

KR     10-2009-0128935 A   * 12/2009

OTHER PUBLICATIONS

T. Okoshi et al. New polarisation-control scheme for optical heterodyne receiver using two Faraday rotators. Electronics Letters, 21:18:787-788, Aug. 29, 1985.*

(Continued)

*Primary Examiner* — Mike Stahl

(57) ABSTRACT

A polarization scrambler based on Faraday magneto-optic effect is disclosed. A polarization control unit (2) is connected between a first rotator unit (1) and a second rotator unit (3). The first rotator unit (1) includes a first optical fiber circle (11) and a first wire coil (12). The second rotator unit (3) includes a second optical fiber circle (31) and a second wire coil (32). ACs with two frequencies f1 and f2 are respectively introduced into the first wire coil (12) and the second wire coil (32), such that the ACs in the two wire coils are changed to control the polarization angle in the two optical fiber circles to independently change within the range of +/−90°. The polarization control unit (2) can ensure motion trajectories of outputted light polarization pointsare in two orthogonal directions, thus achieving uniform polarization disturbance.

2 Claims, 2 Drawing Sheets

(56) References Cited

U.S. PATENT DOCUMENTS

| | | | | |
|---|---|---|---|---|
| 4,923,290 A * | 5/1990 | Brinkmeyer | ......... | G02F 1/0134 |
| | | | | 359/245 |
| 5,657,151 A * | 8/1997 | Swan | ........ | G02F 1/09 |
| | | | | 359/281 |
| 5,739,943 A * | 4/1998 | Ohshima | ........ | G02F 1/0311 |
| | | | | 324/244.1 |
| 6,792,192 B1 * | 9/2004 | Kumayasu | ........ | G02F 1/09 |
| | | | | 359/281 |
| 2017/0261690 A1 * | 9/2017 | Wu | ........ | G02B 6/2786 |

OTHER PUBLICATIONS

J. Prat et al. Experimental demonstration of an all-fiber endless polarization controller based on Faraday rotation. IEEE Photonics Technology Letters, 7:12:1430-1432, Dec. 1995.*

J. Prat et al. Dispersion-shifted fiber polarization scrambler based on Faraday effect. IEEE Photonics Technology Letters, 11:7:845-847, Jul. 1999.*

* cited by examiner

POLARIZATION SCRAMBLER BASED ON FARADAY MAGNETO-OPTIC EFFECT

CROSS REFERENCE OF RELATED APPLICATION

The present invention claims priority under 35 U.S.C. 119(a-d) to CN 201710072555.0, filed Feb. 10, 2017.

BACKGROUND OF THE PRESENT INVENTION

Field of Invention

The present invention relates to the field of polarization optical fiber sensing technology, and more particularly to a polarization scrambler based on Faraday magneto-optic effect.

Description of Related Arts

The polarization scrambler is mainly used for any optical systems which are sensitive to the polarization states and unable to control the polarization states thereof. The purpose of the polarization scrambler is to rapidly change the polarization state of the system, so as to achieve the average polarization of the data, thereby improving the signal to noise ratio of the system. America Agiltron Company (MA, USA) and China Suzhou Bonphot Optoelectronics Co., Ltd. adopt E-O crystal wave plates, whose principle is that apply a high voltage to control the phase shift of the wave plate, and speed can reach the order of ten nanoseconds. America General Photonics Corporation (CA, USA) developed an all-fiber polarization scrambler, which uses single-mode fibers under stress to change the polarization state; the stress is applied to the SM fibers in the form of PZT at a velocity in the order of microseconds. However, the above two kinds of polarization scramblers are expensive. China Beijing Qi-Red Photoelectric Technology Co., Ltd. developed a polarization scrambler which is based on high-speed rotating fiber wave plates. The polarization scrambler has advantages of low cost and compact structure. However, due to mechanical movement, its service life is affected.

SUMMARY OF THE PRESENT INVENTION

The present invention provides a polarization scrambler which is simple in manufacture, low in cost, good in effect and long in service life, and is adapted for any optical fiber sensing and optical fiber communicating systems which are sensitive to the polarization states and unable to control the polarization states thereof.

The principle of the polarization scrambler based on Faraday magneto-optic effect, provided by the present invention, is as follows. The magnitudes and the frequencies of ACs (alternating currents) in two wire coils which wrap around the exterior of the optical fiber circles are respectively changed to achieve the purpose of polarization disturbance.

The present invention provides an all-fiber polarization scrambler based on Faraday magneto-optic effect, comprising a first rotator unit, a polarization control unit and a second rotator unit, wherein the polarization control unit is connected between the first rotator unit and the second rotator unit; the first rotator unit comprises a first optical fiber circle and a first wire coil which evenly wraps around an exterior of the first optical fiber circle; the second rotator unit comprises a second optical fiber circle and a second wire coil, the second rotator unit and the first rotator unit are same in structure; ACs (alternating currents) with various frequencies and magnitudes are respectively introduced into the first wire coil and the second wire coil, the frequencies of the ACs within the two wire coils meet a formula of f1−f2=1/T, here, f1 is an AC frequency of the first wire coil, f2 is an AC frequency of the second wire coil, and T is a data average time.

The frequency variation of AC is usually limited by the inductance of the wire coil, and the general reachable frequency range is about 1 kHz-10 kHz.

The present invention has advantages as follows.

1. Low cost. The present invention is able to be manufactured by components which are low in cost.

2. Simple structure. The present invention can be manufactured based on devices which are greatly available in the market.

3. Low loss. The present invention is an all-fiber polarization scrambler, so the insertion loss is low.

4. Long service life. There is no mechanical motion.

5. Medium speed. The speed which varies within the range of 1 kHz-10 kHz can meet the demand of most sensing systems.

These and other objectives, features, and advantages of the present invention will become apparent from the following detailed description, the accompanying drawings, and the appended claims.

BRIEF DESCRIPTION OF THE DRAWINGS

In order to more clearly illustrate the present invention and the technical solutions, the drawings, which are to be used in the description of the embodiments or the prior arts, are briefly described as below. It will be apparent that the drawings in the following description are merely exemplary of the present invention and that other drawings may be obtained by those skilled in the art without departing from the inventive work.

DETAILED DESCRIPTION OF THE PREFERRED EMBODIMENT

The present invention is further explained with accompanying drawings but is not the limitation to the scope protected by the present invention.

Figure 1:
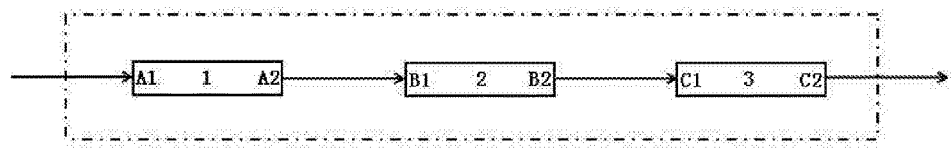
FIG. 1 is a structural diagram of a polarization scrambler based on Faraday magneto-optic effect according to a preferred embodiment of the present invention.

Referring to FIG. 1 of the drawings, a polarization scrambler based on Faraday magneto-optic effect according to a preferred embodiment of the present invention is illustrated, comprising a first rotator unit 1, a polarization control unit 2 and a second rotator unit 3. The first rotator unit 1 comprises a first optical fiber circle 11 and a first wire coil 12. The second rotator unit 3 comprises a second optical fiber circle 31 and a second wire coil 32.

The polarization control unit 2 is connected between the first rotator unit 1 and the second rotator unit 3.

In the present invention, the first rotator unit 1 and the second rotator unit 3 are same in structure.

In the present invention, both the first optical fiber circle 11 and the second optical fiber circle 31 are made from a section of single-mode fiber.

The connection between the components is as follows. The first wire coil 12 evenly wraps around an exterior of the first optical fiber circle 11, a single-mode fiber of a system is connected with an input end A1 of the first optical fiber circle 11, an output end A2 of the first optical fiber circle 11 is connected with an input end B1 of the polarization control unit 2, an output end B2 of the polarization control unit 2 is connected with an input end C1 of the second optical fiber circle 31 of the second rotator unit 3, and an output end C2 of the second optical fiber circle 31 is connected with the system.

Figure 2A:
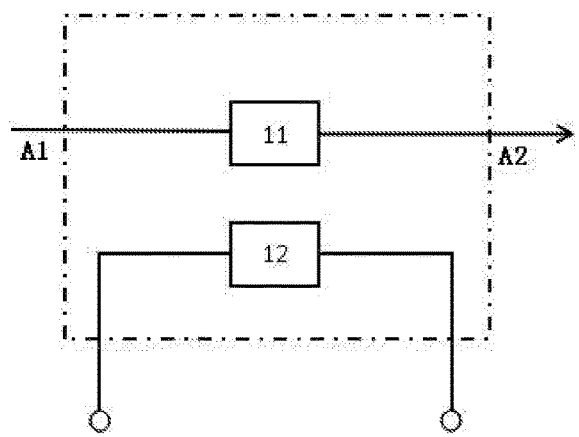
FIG. 2A is a structural diagram of a first rotator unit according to the above preferred embodiment of the present invention.

As shown in FIG. 2A, the first rotator unit 1 comprises the first optical fiber circle 11 and the first wire coil 12 which evenly wraps round the exterior of the first optical fiber circle 11. Through adjusting the AC in the first wire coil 12 with a frequency of f1, a polarization angle of the first optical fiber circle 11 is independently changed within a range of +/−90°.

Figure 2B:
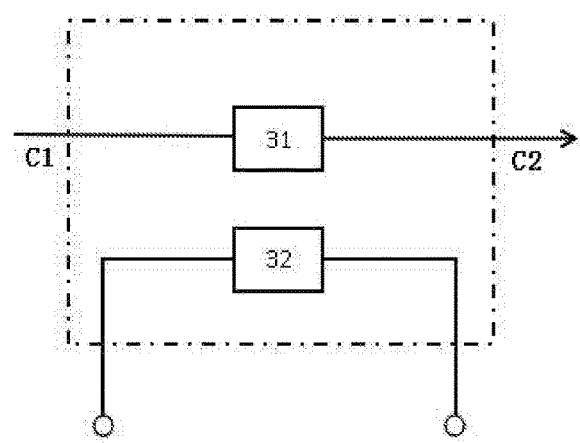
FIG. 2B is a structural diagram of a second rotator unit according to the above preferred embodiment of the present invention.

As shown in FIG. 2B, the second rotator unit 3 and the first rotator unit 1 are same in structure. Through adjusting the AC in the second wire coil 32 with a frequency of f2, a polarization angle of the second optical fiber circle 31 is independently changed within a range of +/−90°, so as to achieve uniform polarization disturbance. To achieve the best polarization disturbance effect, the frequencies f1 and f2 of the ACs in the two wire coils meet a formula of f1−f2=1/T, wherein f1 is an AC frequency of the first wire coil 12, f2 is an AC frequency of the second wire coil 32, and T is a data average time.

Figure 3:
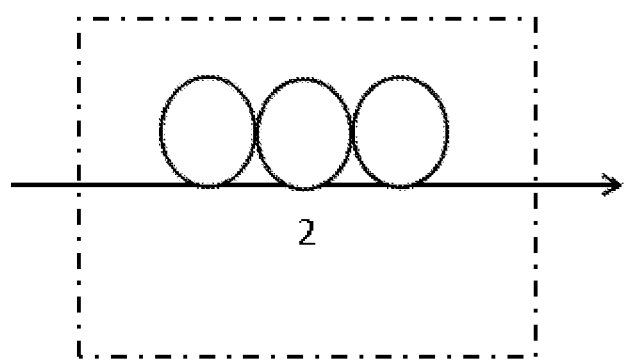
FIG. 3 is a working principle diagram of a polarization control unit according to the above preferred embodiment of the present invention.

As shown in FIG. 3, the polarization control unit 2 provided by the present invention is able to ensure the motion trajectories of the outputted light polarization pointsare in two orthogonal directions.

The basic principles, main features and advantages of the present invention have been shown and described above. It should be understood by those skilled in the art that the present invention is not limited by the above-described embodiments, and that the principles described in the foregoing examples and description are illustrative of the principles of the present invention, and that the present invention will be changed and improved without departing from the spirit and scope of the present invention, and that the changes and improvements will fall within the scope of the present invention as claimed. It is intended that the scope of the present invention be defined by the appended claims and their equivalents.

What is claimed is:

1. A polarization scrambler based on Faraday magneto-optic effect, comprising a first rotator unit (1), a polarization control unit (2) and a second rotator unit (3), wherein:

the polarization control unit (2) is connected between the first rotator unit (1) and the second rotator unit (3); an output end (A2) of a first optical fiber coil (11) of the first rotator unit (1) is connected with an input end (B1) of the polarization control unit (2), an output end (B2) of the polarization control unit (2) is connected with an input end (C1) of a second optical fiber coil (31) of the second rotator unit (3); ACs (alternating currents) with two frequencies f1 and f2 are respectively introduced into a first wire coil (12) of the first rotator unit (1) and a second wire coil (32) of the second rotator unit (3), such that magnitudes and frequencies of the ACs in the two wire coils (12, 32) are changed to achieve a purpose of polarization disturbance; the polarization control unit (2) is able to ensure motion trajectories of outputted light polarization points are in two orthogonal directions;

the first rotator unit (1) comprises the first optical fiber coil (11) and the first wire coil (12) which evenly wraps round an exterior of the first optical fiber coil (11); the second rotator unit (3) comprises the second optical fiber coil (31) and the second wire coil (32) which evenly wraps round an exterior of the second optical fiber coil (31); both the first optical fiber coil (11) and the second optical fiber coil (31) are made from a section of single-mode fiber; the first rotator unit (1) and the second rotator unit (3) are same in structure;

the ACs with the frequencies of f1 and f2 are respectively introduced into the first wire coil (12) and the second wire coil (32); through adjusting the ACs with the frequency of f1 within the first wire coil (12) and the frequency of f2 within the second wire coil (32), a polarization angle in the two optical fiber coils (11, 31) is independently changed in a range of +/−90°, so as to achieve uniform polarization disturbance; the frequencies f1 and f2 of the ACs in the two wire coils meet a formula of f1−f2=1/T, here, f1 is the AC frequency of the first wire coil (12), f2 is the AC frequency of the second wire coil (32), and T is a data average time.

2. The polarization scrambler based on Faraday magneto-optic effect, as recited in claim 1, wherein: an input end (A1) of the first optical fiber coil (11) is configured to be connected with an optical system; the input end (B1) of the polarization control unit (2) is connected with the output end (A2) of the first optical fiber coil (11), the output end (B2) of the polarization control unit (2) is connected with input end (C1) of the second optical fiber coil (31), and an output end (C2) of the second optical fiber coil (31) is configured to be connected with the optical system.

* * * * *